(12) United States Patent
VanderPol et al.

(10) Patent No.: US 6,966,731 B2
(45) Date of Patent: Nov. 22, 2005

(54) CUTTING TOOL AND TRACK GUIDANCE SYSTEM

(75) Inventors: Jerald W. VanderPol, Shingle Springs, CA (US); Lane L. Larson, Folsom, CA (US)

(73) Assignee: Tri Tool Inc., Rancho Cordova, CA (US)

( * ) Notice: Subject to any disclaimer, the term of this patent is extended or adjusted under 35 U.S.C. 154(b) by 0 days.

(21) Appl. No.: 10/776,181

(22) Filed: Feb. 12, 2004

(65) Prior Publication Data

US 2004/0175247 A1 Sep. 9, 2004

Related U.S. Application Data

(60) Provisional application No. 60/450,699, filed on Mar. 3, 2003.

(51) Int. Cl.[7] .................................................. B23C 1/20
(52) U.S. Cl. .................. 409/179; 409/178; 144/136.95; 105/29.1
(58) Field of Search .............................. 409/178–179, 409/180, 182; 144/154.5, 136.95, 371; 105/29.1, 144

(56) References Cited

U.S. PATENT DOCUMENTS

| | | | | |
|---|---|---|---|---|
| 2,161,040 A | * | 6/1939 | Harmon, Jr. ................. | 409/178 |
| 2,921,492 A | * | 1/1960 | Worth ......................... | 409/178 |
| 3,010,352 A | * | 11/1961 | Dunlap ........................ | 409/138 |
| 3,176,587 A | * | 4/1965 | Appleton et al. ............. | 409/84 |
| 3,226,027 A | * | 12/1965 | Cable et al. ................ | 105/29.1 |
| 3,456,555 A | | 7/1969 | Dunlap | |
| 3,477,341 A | * | 11/1969 | Rickenbrode ................ | 409/179 |
| 3,575,364 A | * | 4/1971 | Frederick .................... | 105/29.1 |
| 3,603,204 A | | 9/1971 | Anderson | |
| 3,722,497 A | * | 3/1973 | Heistand et al. .............. | 125/14 |
| RE28,121 E | * | 8/1974 | Gulley ........................ | 173/32 |
| 4,109,959 A | * | 8/1978 | Barecki et al. ........ | 297/216.14 |
| 4,249,769 A | * | 2/1981 | Barecki ...................... | 296/68.1 |
| 4,297,061 A | | 10/1981 | Wolfe et al. | |
| 4,418,591 A | * | 12/1983 | Astle ........................... | 82/113 |
| 4,422,384 A | * | 12/1983 | Johnson et al. ............ | 105/29.1 |
| 4,519,169 A | | 5/1985 | Smith | |
| 4,570,542 A | | 2/1986 | Cable et al. | |
| 4,739,685 A | | 4/1988 | Ricci | |
| 4,944,205 A | | 7/1990 | Ricci | |
| 5,001,870 A | * | 3/1991 | Yokota et al. ................. | 451/92 |
| 5,044,844 A | | 9/1991 | Backhouse | |
| 5,189,933 A | | 3/1993 | Ricci | |
| 5,240,359 A | | 8/1993 | Backhouse | |
| 5,403,133 A | | 4/1995 | Kim | |
| 5,549,024 A | | 8/1996 | Ricci | |
| 5,562,043 A | * | 10/1996 | Gromes ...................... | 105/29.1 |
| 6,025,569 A | | 2/2000 | McCardle et al. | |
| 6,146,067 A | | 11/2000 | Owens | |
| 6,220,174 B1 | * | 4/2001 | Gudel et al. ............... | 105/29.1 |
| 6,244,189 B1 | | 6/2001 | Kingsley | |
| 6,476,339 B2 | | 11/2002 | Easterday | |
| 6,494,307 B1 | | 12/2002 | Kozak et al. | |

\* cited by examiner

*Primary Examiner*—Erica Cadugan
(74) *Attorney, Agent, or Firm*—Bacon & Thomas, PLLC

(57) ABSTRACT

A cutting tool and track system includes a multi-segment track assembly configured to be removably attached to a surface of a workpiece, a carriage assembly configured to ride along the track assembly, a carriage drive mechanism arranged to drive the carriage assembly along the track assembly, a cutting tool assembly connected to the carriage assembly, and a tool driving system connected to the cutting tool assembly. The cutting tool assembly rotatably supports an end mill type cutting tool that may be driven in a radial cutting plane about the axis of a tubular workpiece or along a workpiece surface. A method is provided for cutting a workpiece wherein a cutting tool assembly rotatably supports an end mill mounted for travel along a predetermined transport path in a cutting plane about a central axis of the workpiece wherein the end mill is first fed through the wall thickness of the workpiece and the cutting tool assembly is moved along the transport path in the cutting plane to cut the workpiece.

15 Claims, 10 Drawing Sheets

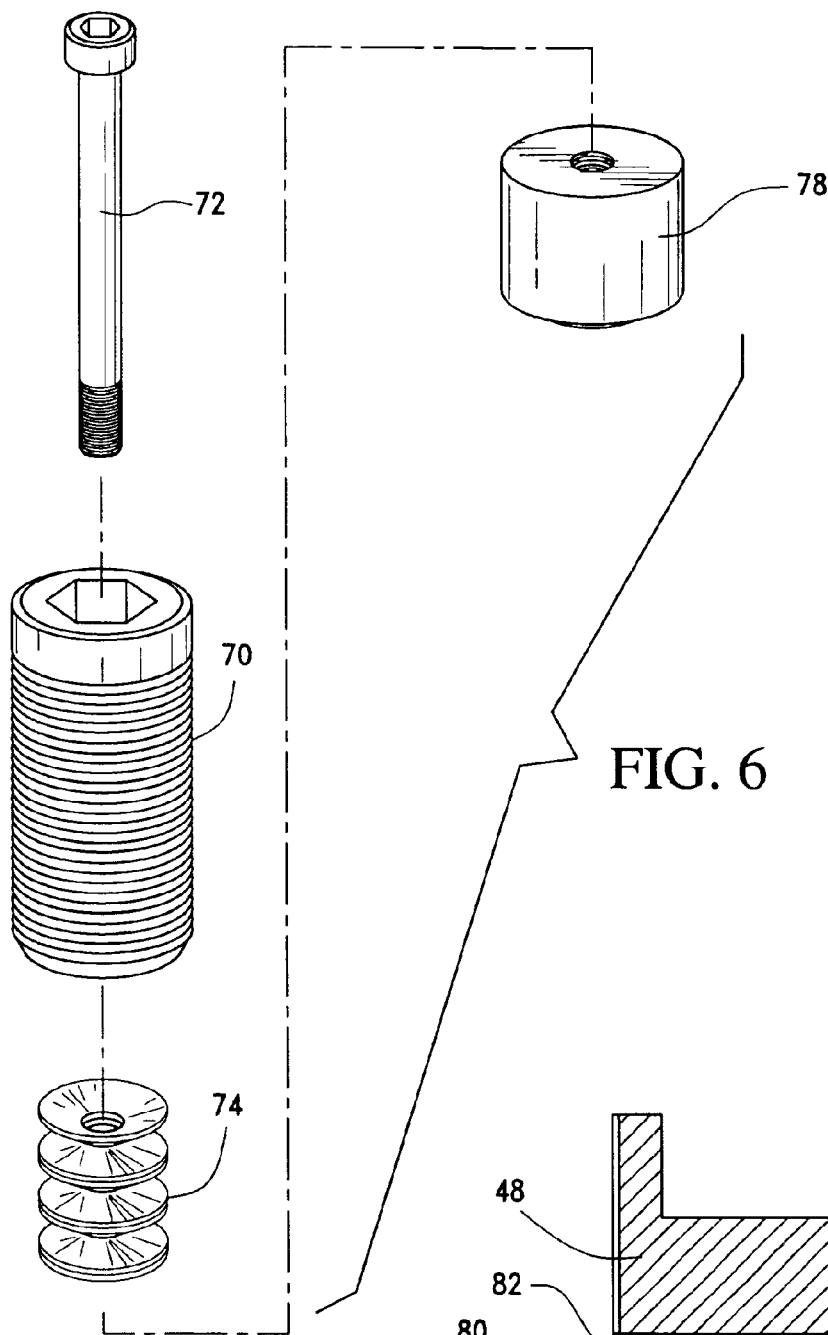
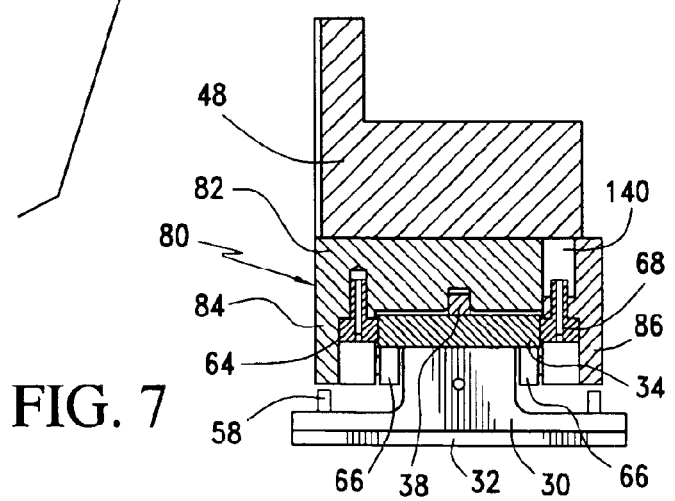
FIG. 6
FIG. 7

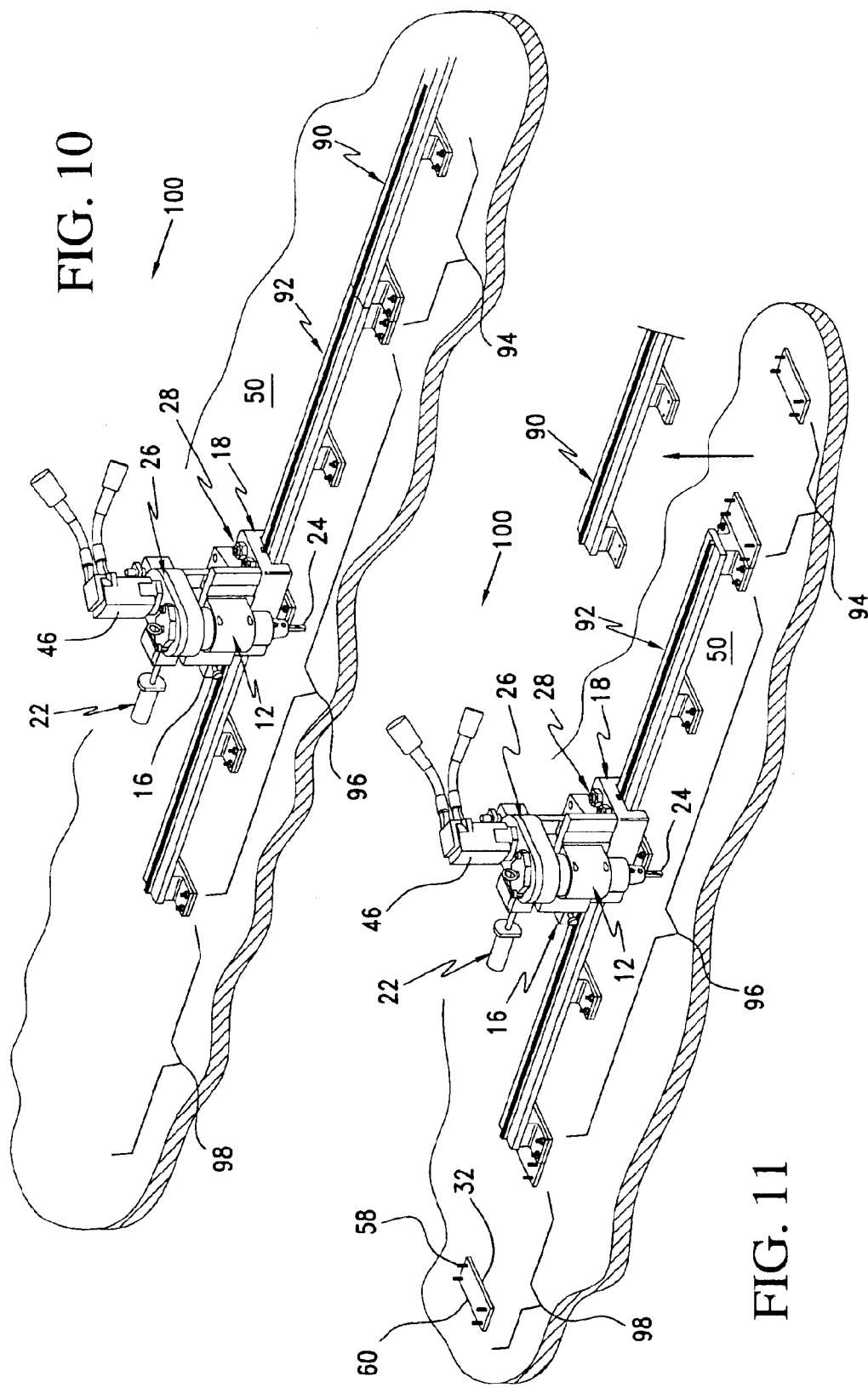

CUTTING TOOL AND TRACK GUIDANCE SYSTEM

This application claims the benefit of provisional application No. 60/450,699 filed Mar. 3, 2003.

BACKGROUND OF THE INVENTION

1. Field of the Invention

The invention relates to a method and cutting tool and track system useful for cutting through a workpiece having flat or arcuate surfaces.

2. Discussion of Related Art

Numerous portable cutting tools are known in the art of cutting workpieces having flat and curved surfaces. In relation to cutting pipes, portable pipe cutting tools are typically used in the field where the use of a fixed machining tool is not appropriate or possible. Types of conventional pipe cutting tools include portable lathes such as one described in U.S. Pat. No. 4,418,591 or roller cutter modules such as one described in U.S. Pat. No. 5,515,756. Generally, conventional portable pipe cutting tools include a rotary tool head carrying a fixed or rotary cutting tool that is driven in rotation about an axis while otherwise fixedly supported relative to the pipe by clamps or a mandrel. Normally, a single-point tool is fed around and into the pipe repeatedly to remove a small amount of material each pass until the pipe is cut through, which in the case of a thick wall may consume a considerable amount of time.

In conventional pipe cutting tools, it is a challenge to locate and support the cutting tool so that smooth and true machining operations can be performed at high tool loadings, while maintaining bearing assemblies free of gross contamination such as chips generated during the machining operation. High radial and thrust loads are encountered during high speed machining of thick walled pipe made of stainless steel and other hard materials, and such machining loads require the use of massive and complicated tool support assemblies.

Known pipe cutting tools are typically designed to fit pipe sizes within certain ranges. Furthermore, such tools may be limited to cutting only pipes and therefore lack the versatility to perform cutting operations on flat or arcuate surfaces.

Another known approach to cutting workpieces, especially larger pieces, involves the use of track guidance systems that comprise a drive track for guiding and feeding a cutting tool along the surface of a workpiece. Conventional track systems known in the art include large structural track systems encircling and rigidly secured to a workpiece such as one a described in U.S. Pat. No. 4,297,061, track systems that are connected to structural members not supported directly onto a workpiece such as one described in U.S. Pat. No. 5,403,133 or lightweight track systems such as those described in U.S. Pat. Nos. 4,570,542 and 6,494,307 that are directly attached to a workpiece with magnets or suctions cups. It has been found, however, that conventional cutting tool and track systems are either not easily and quickly attachable or removable from a workpiece or insufficiently robust to withstand the rigors of high speed, high load machining.

Therefore, it is desirable to provide a metal cutting tool and track guidance system that is highly portable, while sufficiently robust to withstand high machining loads and configured to be rigidly secured to a workpiece. It is also desirable to provide a cutting tool and guidance track system that is capable of being quickly and easily attached and removed from a workpiece having flat as well as curved surfaces. It is further desirable to provide a cutting tool and track guidance system which can accommodate a variety of workpieces whether tubular, flat or arcuate, and precisely cut through such workpieces in a minimal amount of time.

BRIEF SUMMARY OF THE INVENTION

The present invention provides a cutting tool and track guidance system for cutting workpieces that are flat as well as arcuate. The cutting tool and track system is adapted to be quickly attachable and removable from a workpiece, while being sufficiently robust to withstand high machining loads.

In accordance with one preferred embodiment of the present invention, the cutting tool and track guidance system includes a track assembly configured to be mounted onto a workpiece, and comprises a multi-segment track assembly formed of multiple, connected track elements. Each track element includes at least a track member and a rack member supported along the longitudinal length of the track member. A carriage assembly is provided that is configured to ride along the track element and is connected to a carriage drive mechanism arranged to drive the carriage assembly along the track. The carriage assembly is configured to carry a cutting tool assembly that including a rotating cutting tool. A tool driving system is connected to the cutting tool assembly and is operable to transmit rotary input motion to the cutting tool assembly. The track elements are designed to be shaped in various configurations to be connected precisely to adjacent track elements in mating relationship and to be separated from track elements in a rapid manner without disassembling the entire multi-segment track assembly.

According to one embodiment of the carriage assembly, a carriage is provided with an adjustable bearing assembly that is arranged to cooperate with the track assembly to support the carriage assembly for travel along the track assembly. The carriage assembly also includes a cam arrangement arranged to cooperate with the track assembly to guide the carriage assembly along the length thereof.

According to one embodiment of the track elements, a plurality of supports are provided which secure to and support each track member when mounted on a workpiece. Each of the supports is configured to be attached to a securing element supported on the workpiece. According to one embodiment, the securing elements include a mount plate supported on the workpiece and a plurality of studs extending therefrom. The supports are configured to receive and be secured to the studs extending from the securing elements. In another embodiment, the securing elements are studs directly mounted on the workpiece and the supports are configured to receive and be secured to the studs.

According to one embodiment of the invention, a plurality of track elements are provided and assembled in an end-to-end relationship along a workpiece defining a continuous transport path for a cutting operation.

The present invention provides a method for cutting flat and arcuate workpieces wherein at least one cutting tool is supported on a workpiece for travel about a portion of the workpiece along a predetermined transport path. According to a preferred method of the invention, the cutting tool rotatably supports an end mill that is positioned generally perpendicular to the workpiece. The end mill is fed radially through the wall thickness of the workpiece and is subsequently fed along the transport path to cut the workpiece in a single pass along the transport path, such path defining a cutting plane if the tool is rotated about a pipe axis.

Other embodiments and the details of the invention will become evident upon review of the following detailed description.

BRIEF DESCRIPTION OF THE DRAWINGS

FIG. 6 is an exploded perspective view of the adjustable bearing assembly according to FIG. 5;

FIG. 7 is a cross-section view taken along line II—II in FIG. 2;

FIGS. 10–13 are schematic perspective views illustrating the transfer of a track element to a different position adjacent another track element on a workpiece.

DETAILED DESCRIPTION OF THE PREFERRED EMBODIMENTS

Figure 1:
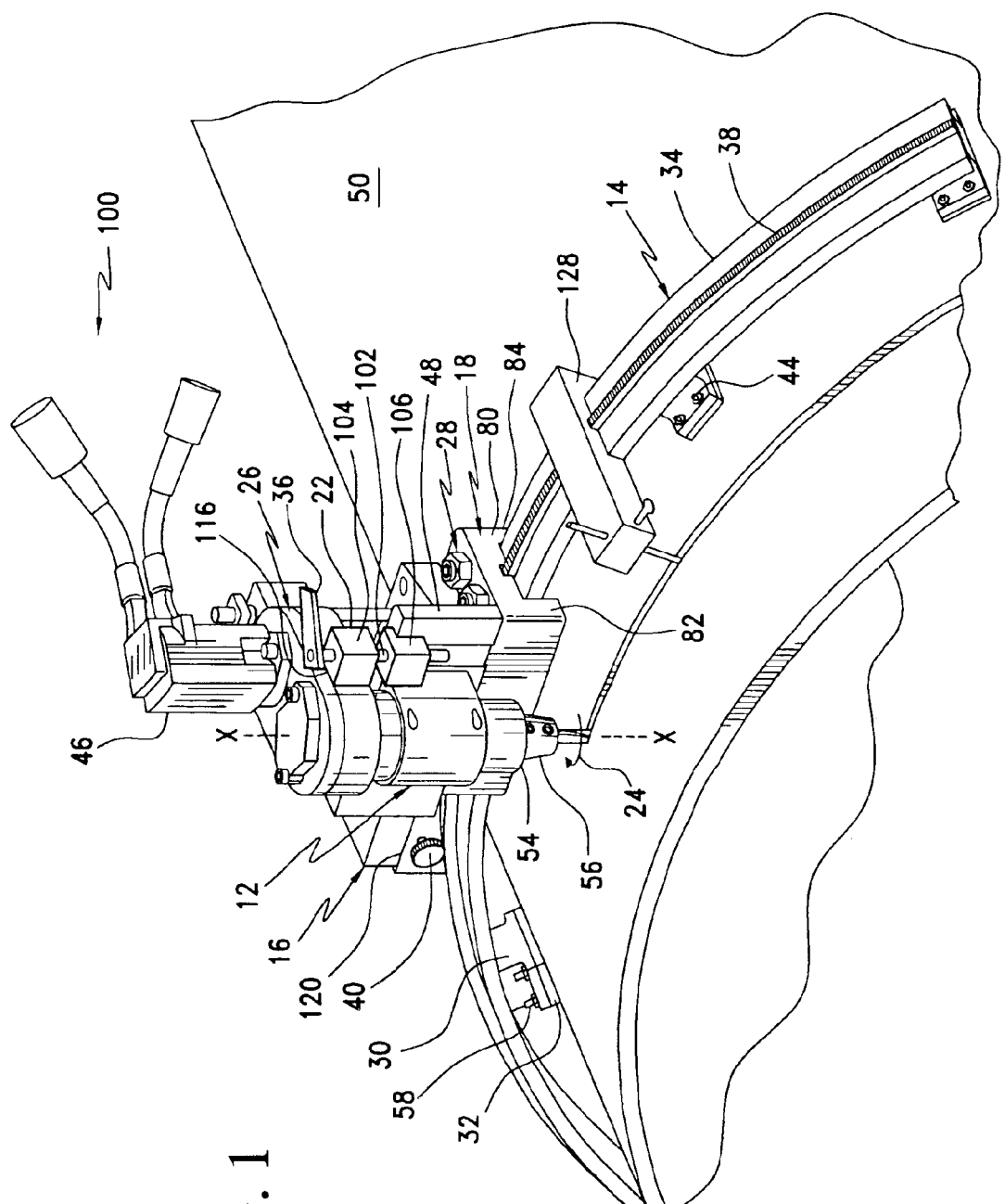
FIG. 1 is a perspective view showing the cutting tool supported on a workpiece.
Figure 2:
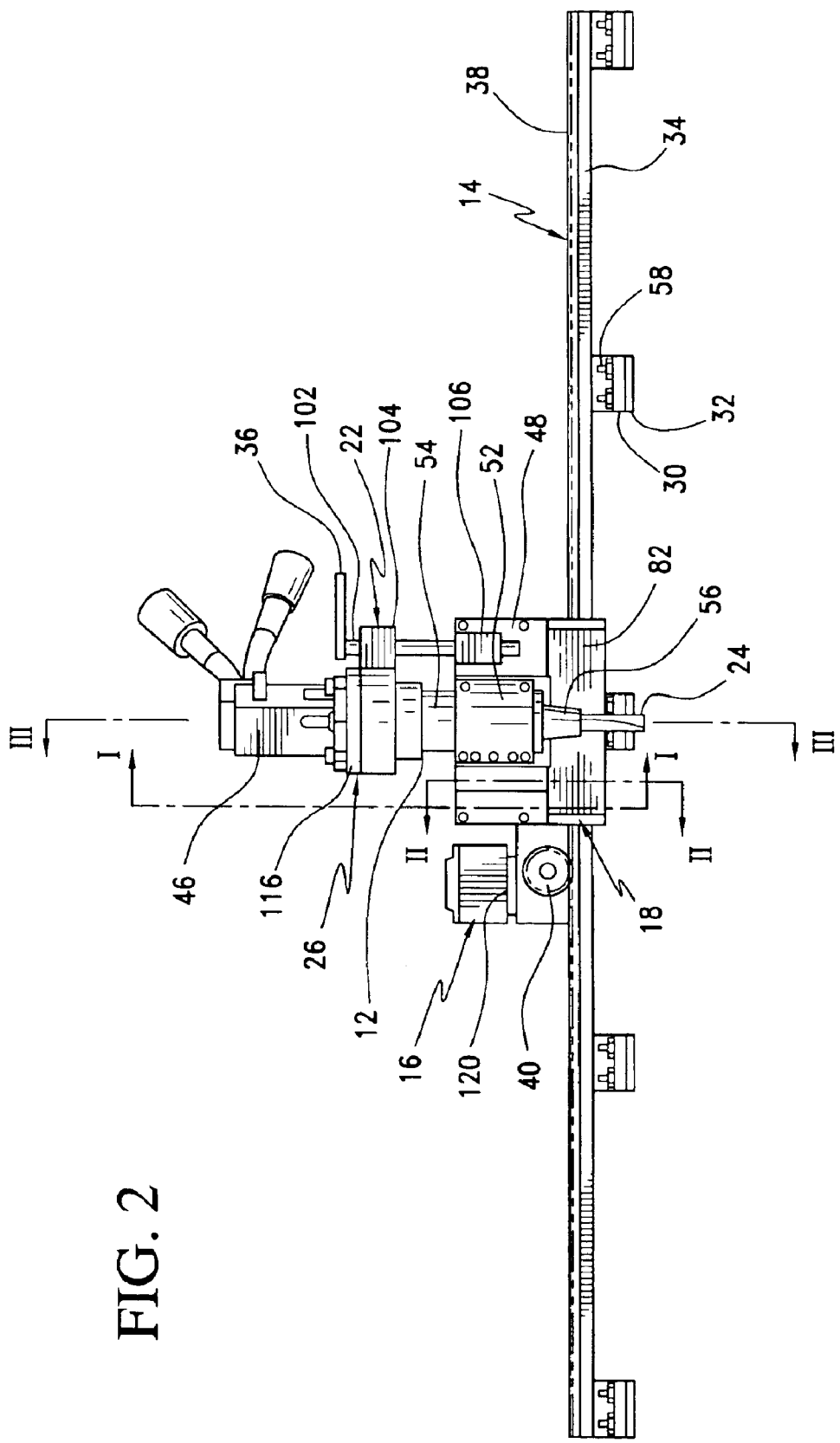
FIG. 2 is an elevational front view showing the cutting tool of the invention.

FIGS. 1–2 show views of a cutting tool and track system 10 according to a preferred embodiment of the invention. The cutting tool and track system 10 comprises a multi-segment track assembly 14 formed of multiple track elements arranged to support a carriage assembly 18 carrying a cutting tool assembly 12 and connected to a carriage drive mechanism 16 for displacing the carriage assembly 18 along the track assembly 14.

Referring to the embodiment shown in FIGS. 1 and 2, each track element includes a track member 34 that may be sufficiently flexible to generally conform to a workpiece having a curved surface. Preferably, the track member 34 is flexible to a degree that will permit the track member 34 to be directly bent to match the geometry of a workpiece. The track member 34 has top, bottom and side surfaces and preferably a substantially rectangular cross-section. The track member 34 is preferably constructed from flexible, high strength carbon steel.

A rack member 38 is attached to the top surface of the track member 34 and extends substantially along the longitudinal length thereof. In one embodiment, the rack member 38 may include a plurality of rack segments which are generally assembled in an end-to-end relationship along the longitudinal length of the track member 34. Alternatively, in another embodiment, the rack member 38 may consist of a single body having generally the same length as the track member 34. The rack member 38 includes a plurality of teeth that are configured to engage with a drive pinion 40 of the carriage drive mechanism 16. The rack member 38 may be welded, attached by suitable fastening elements or secured to the track member 34 by any other suitable means. The rack member 38 is preferably made of flexible, high strength carbon steel.

A plurality of supports 30 having a base portion with a plurality of support holes 44 are attached to the bottom of the track member 34. The supports 30 may be attached to the bottom of the track member 34 in any conventional manner, including welding or using appropriate fasteners.

According to one embodiment shown in FIG. 1, supports 30 are configured to be rigidly supported to a workpiece by being positioned on securing elements 32 secured to a workpiece. Each securing element 32 may comprise a support plate 60 arranged to be welded onto the workpiece, and configured and dimensioned to substantially receive a bottom portion of a support 30. The securing elements 32 may include a plurality of studs 58 that are configured to be received by the support holes 44 of the supports 30 and secured therewith by suitable fasteners.

Figure 3:
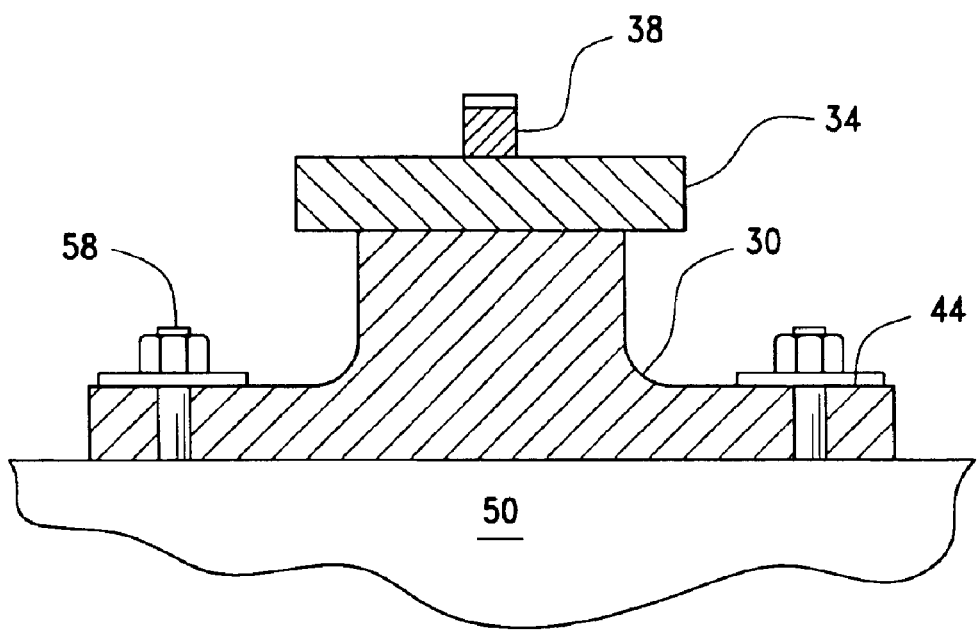
FIG. 3 shows a cross-section view of an embodiment of the track assembly.

In another embodiment shown in FIG. 3, the securing elements 32 may comprise studs 58 that are welded directly onto a workpiece by a stud welding gun and configured to be received by the support holes 44 and secured to the supports 30 by suitable fasteners. Examples of a stud welding gun are disclosed in U.S. Pat. Nos. 6,025,569 and 6,476,339.

Each track element of the track assembly 14 of the invention is configured to be assembled with another track element of the invention in an end-to-end relationship such that the track members of adjacent track elements are positioned laterally adjacent to one another so as to define a single transport path for a cutting tool. Accordingly, the track member 34 of each track element may include connector elements, such as interlocking tongue and groove joints, slot and tab connections, bayonet connectors or screw-type connectors, arranged at opposed end portions of each track member 34 to connect to corresponding connector elements of adjacent track elements.

As shown in FIG. 1, the track assembly 14 may include a location guide 128 securable on the track member 34 and having a pin indicating the location of the centerline of a cutting plane on the workpiece.

According to a preferred embodiment, the carriage drive mechanism 16 includes a motor housing 120 that contains a high torque motor (not shown) connected to the drive pinion 40. The high torque motor may be energized by electrical, fluid, pneumatic or other available energy. The carriage drive mechanism 16 may provide a gear reduction system (not shown) supported within the motor housing 120 and enabling the use of the high torque motor to transmit input rotational drive motion to the drive pinion 40. For example, the carriage drive mechanism 18 may include a hydraulic motor produced by Anchor Lamina Inc., part no. A-125 and connected to a gear reducer produced by Boston Gear Co., part no. WA-718-200-G. Such carriage drive mechanisms include components that are well known in the art and any such assembly could be utilized without exceeding the scope of this invention.

In a preferred embodiment, the cutting tool assembly 12 is secured to an angle plate 48 having a generally perpendicular profile and supported to the carriage assembly 18. The angle plate 48 is generally configured to support the cutting tool assembly 12 in a substantially perpendicular position relative to the carriage assembly 18. It will be understood, however, that the angle plate 48 is not limited to having a generally perpendicular profile and any suitable profile of an angle plate may be utilized to position the cutting tool assembly 12 relative to the carriage assembly 18.

Figure 4:
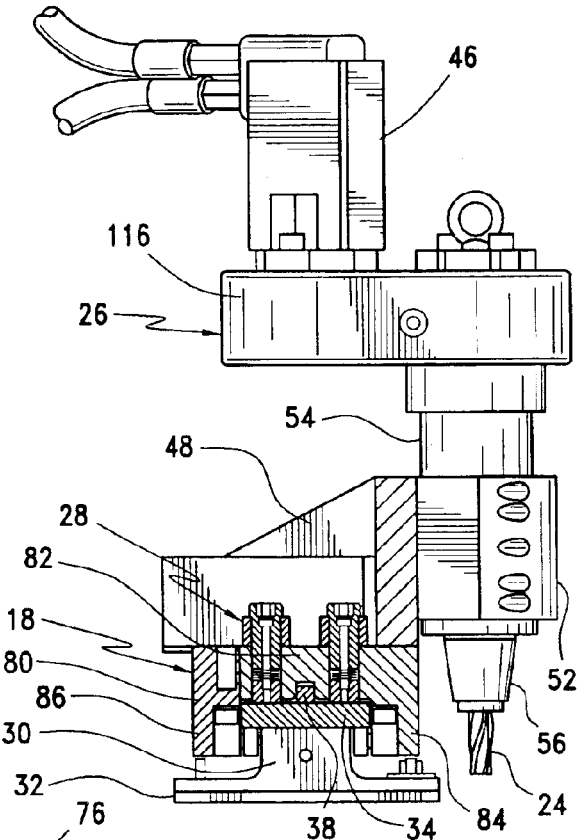
FIG. 4 is cross-section view taken along line I—I in FIG. 2.

As shown in FIG. 4, the carriage assembly 18 preferably includes a deck carriage 80 having a substantially planar platform 82 with top and bottom surfaces and a pair of opposed flanges 84, 86 depending from the sides of the platform 82. The opposed flanges 84, 86 may be integrally formed from the platform 82 or connected with suitable fasteners as exemplified with flange 86. The top surface of platform 82 is arranged to support an angle plate 48 that is configured to connect the tool assembly 12 with the carriage assembly 18. The bottom surface of the platform 82 is provided with a cam follower arrangement and includes a longitudinal groove 88 defined along the length thereof that is configured and dimensioned to receive the rack member 38 when supported on the track assembly 14. The deck carriage 80 is arranged to support at least two adjustable bearing assemblies 28 that are configured to extend through threaded holes 130 of the platform 82 and ride along the top surface of the track member 34 of the track assembly 14.

Figure 5:
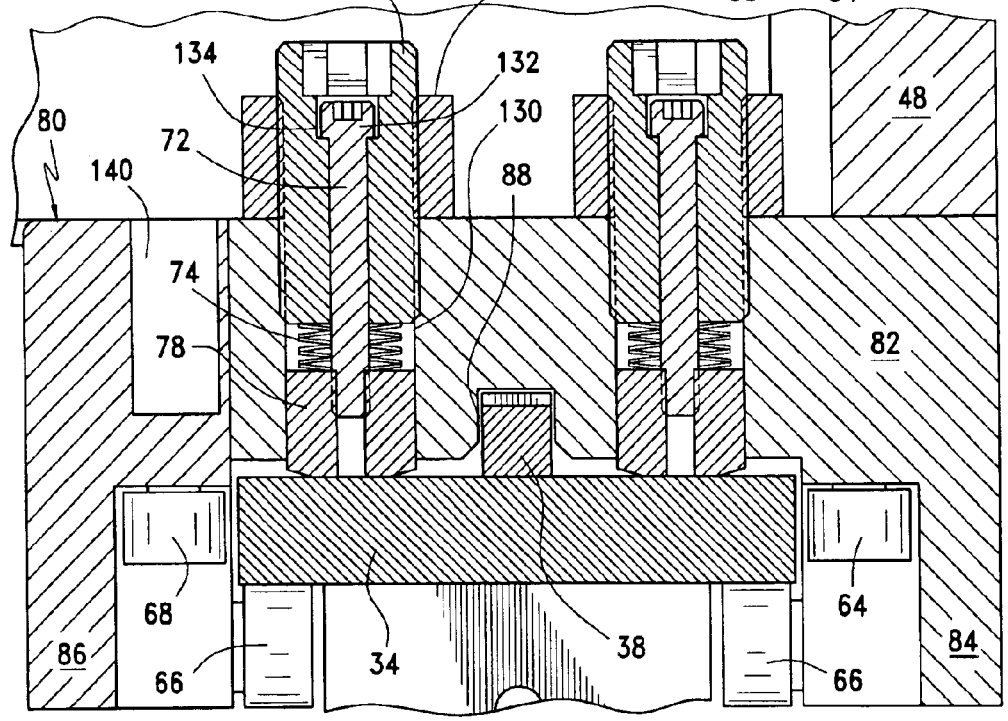
FIG. 5 is a sectional view of the adjustable bearing assembly of the carriage assembly according to FIG. 4.

In a preferred embodiment illustrated in FIG. 5, the adjustable bearing assembly 28 is shown received and supported by the deck carriage 82. In both FIGS. 5 and 6, the bearing assembly 28 includes a pin element 72 having a head portion 134 and a threaded distal end that extends through a sleeve member 70 and one or more Belleville springs 74 (for example, conical compression type springs) to engage a bearing 78. The head portion 132 of the pin element 72 is configured to rest against an internal shoulder portion 134 of the sleeve member 70. The sleeve member 70 includes external threads which engage the threaded hole 130 and a retaining nut 76 is provided which is configured to engage the external threads of sleeve member 70 and be secured against the top surface of the deck platform 82. The Belleville springs 74 are slightly deformed when positioned between the sleeve member 70 and bearing 78. When the retaining nut 76 is tightened against the deck platform 82, the bearing assembly 28 is secured into position relative to the carriage assembly. If retaining nut 76 is loosened, the bearing assembly 28 may be selectively loosened or tightened relative to the track member 34.

As shown in FIGS. 4, 5 and 7, the carriage assembly 18 preferably includes a cam arrangement that may include a plurality of cam followers 66 having axles protruding perpendicular from flanges 84, 86 of the deck carriage 80 and configured to ride along the bottom surface of the track member 34. The cam arrangement may also include at least one cam follower 64 having axles protruding parallel from one of the flanges 84, 86 and configured to ride along a side surface of the track member 34.

At least one adjustable cam follower 68 may be included which is adjustably connected within slot 140 formed in one of the flanges 84, 86 and has an axle extending generally parallel to the flange 84, 86. The adjustable cam follower 68 may be locked in place by a set screw to the flange 84, 86 when positioned in a desired position relative to the track member 34. Generally, the desired position is such that the adjustable cam follower 68 draws the deck carriage 80 against the side surface of the track member 34 to thereby eliminate play between the deck carriage 80 and the track member 34.

As is evident in FIGS. 5 and 7, showing views of opposite sides of the carriage assembly, two adjustable cam followers 68 are provided on opposite sides of the deck carriage 80.

The specific cam arrangement disclosed herein may be varied in accordance with known principles, provided that a suitable force is applied to the track member 34 so that the carriage assembly 18 is securely retained on the track member 34 as the carriage assembly 18 carrying the tool assembly 12 is driven along the transport path 100.

Figure 8:
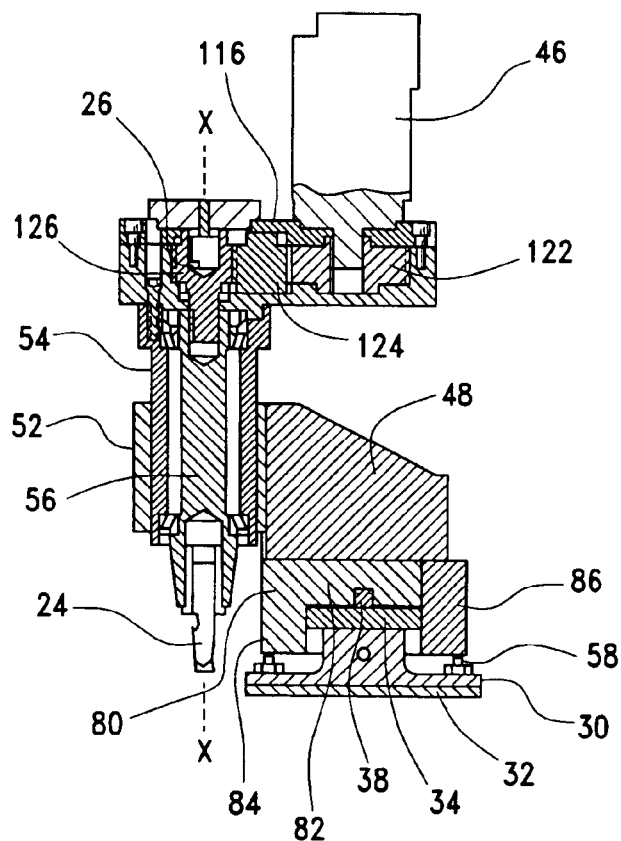
FIG. 8 is a cross-section view taken along line III—III in FIG. 2.

According to a preferred embodiment illustrated in FIG. 8, the cutting tool assembly 12 includes a spindle 56 rotatable about longitudinal axis X—X and positioned in spindle housing 54. The spindle housing 54 is slidably positioned within spindle support 52 secured to the angle plate 48. The spindle 56 is arranged to receive a cutting tool 24, such as an end mill, that is secured to the spindle 56 with a suitable clamping arrangement or fasteners. A tool drive mechanism 46 is connected to an appropriate rotary motion transmitting device or a gear assembly 26 that is connected to the spindle 56 to transmit rotary input motion to the spindle 56 about longitudinal axis X—X. Appropriate bearings are provided to support the spindle 56 for rotary motion within the spindle housing 54 and to enable axial displacement relative to the spindle housing 54. Such cutting tool assemblies are well known in the art and any such assembly could be utilized without exceeding the scope of this invention The gear assembly 26 includes a stationary gear housing 116 containing a gear arrangement and may be supported to the spindle housing 54. The gear arrangement may include a drive gear 122 operatively connected to the tool drive mechanism 46 for rotation therewith. The drive gear 122 may be arranged to engage with a transfer gear 124 which in turn may engage a rotatable component or gear 126 concentrically supported about a proximal end of the spindle 56 for rotation therewith. Such gear assemblies are well known in the art and any such assembly could be utilized without exceeding the scope of this invention.

The tool drive mechanism 46 may be activated electrically, hydraulically, or pneumatically.

Figure 9:
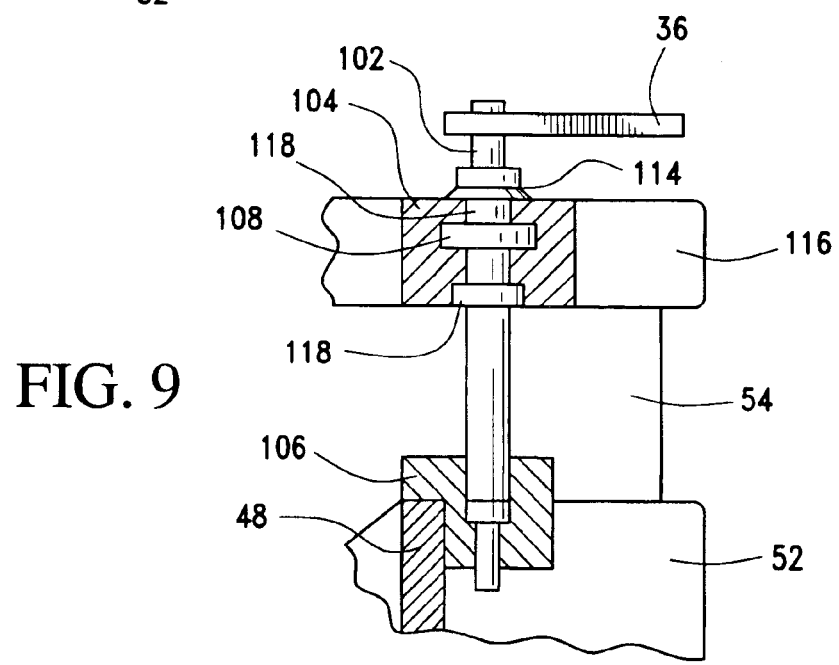
FIG. 9 is a cross-sectional view of the feed mechanism in FIG. 2.

Referring to FIG. 9, the feed mechanism 22 preferably includes a feed screw 102 having threaded proximal and distal ends, and arranged to extend through an upper plate 104 rigidly secured to the gear box assembly housing 116 and a lower plate 106 rigidly secured to a shoulder 68 of the angle plate 48. The feed screw 102 may be configured to extend through flanged bushing 114 disposed above the upper plate 104 and connect to a ratchet device 108 disposed in the upper plate 104. The proximal end of the feed screw 102 is connected to a feed lever 36 disposed above the upper plate 102 and the distal end of the feed screw 102 is connected to a threaded feed nut 112 secured within the lower plate 106. Appropriate bearings 118 as illustrated support the feed screw 102 within the upper and lower plates 104, 106.

The feed lever 36 is arranged to be pivoted to advance the feed screw 102 along the threads of the feed nut 112 to thereby move spindle 56 relative to the shoulder 68 of the angle plate 48.

The feed mechanism arrangement may be varied in accordance with known machine tool principles for advancing a tool head towards a workpiece.

Having described the preferred embodiments of the various subassemblies of a track supported tool according to the present invention, the features and advantages of its operation will be described.

As shown in FIG. 1, the track assembly 14 is supported on the periphery of pipe 50. In particular, the track member 34 and rack member 38 are supported and flexed about a portion of the peripheral surface of a pipe 50 having a central axis. The track assembly 14 is connected to the pipe 50 with the securing elements 32 including support plates 60 welded onto the pipe and which receive supports 30 connected to the track member 34. As shown, the mount studs 58 extend through the support holes 44 of the supports 30 and are secured with suitable fasteners. The drive mechanism 16 is secured to the carriage assembly 18 mount the tool assembly 12 and positioned on the track assembly 14 such that the pinion 40 meshes with the rack member 38.

The spindle 56 is illustrated as having been moved into an appropriate position by the feed mechanism 22 whereby the cutting tool 24 is being rotatably driven by tool drive mechanism 46 about longitudinal axis X—X. The cutting tool 24 is fed radially through the wall thickness of the pipe 50 along its rotational axis and is driven transversely of its rotational axis by the carriage drive mechanism 16 on transport path 100 along the track member 34 to remove pipe material and thereby cut the pipe 50.

In a preferred embodiment shown in FIG. 2, the cutting tool 24 is an end mill which is firstly rotated about its rotary axis and fed through the wall of the pipe 50. The cutting tool assembly 12 is subsequently driven along the transport path in one pass to cut off a portion of the pipe 50.

Figure 12:
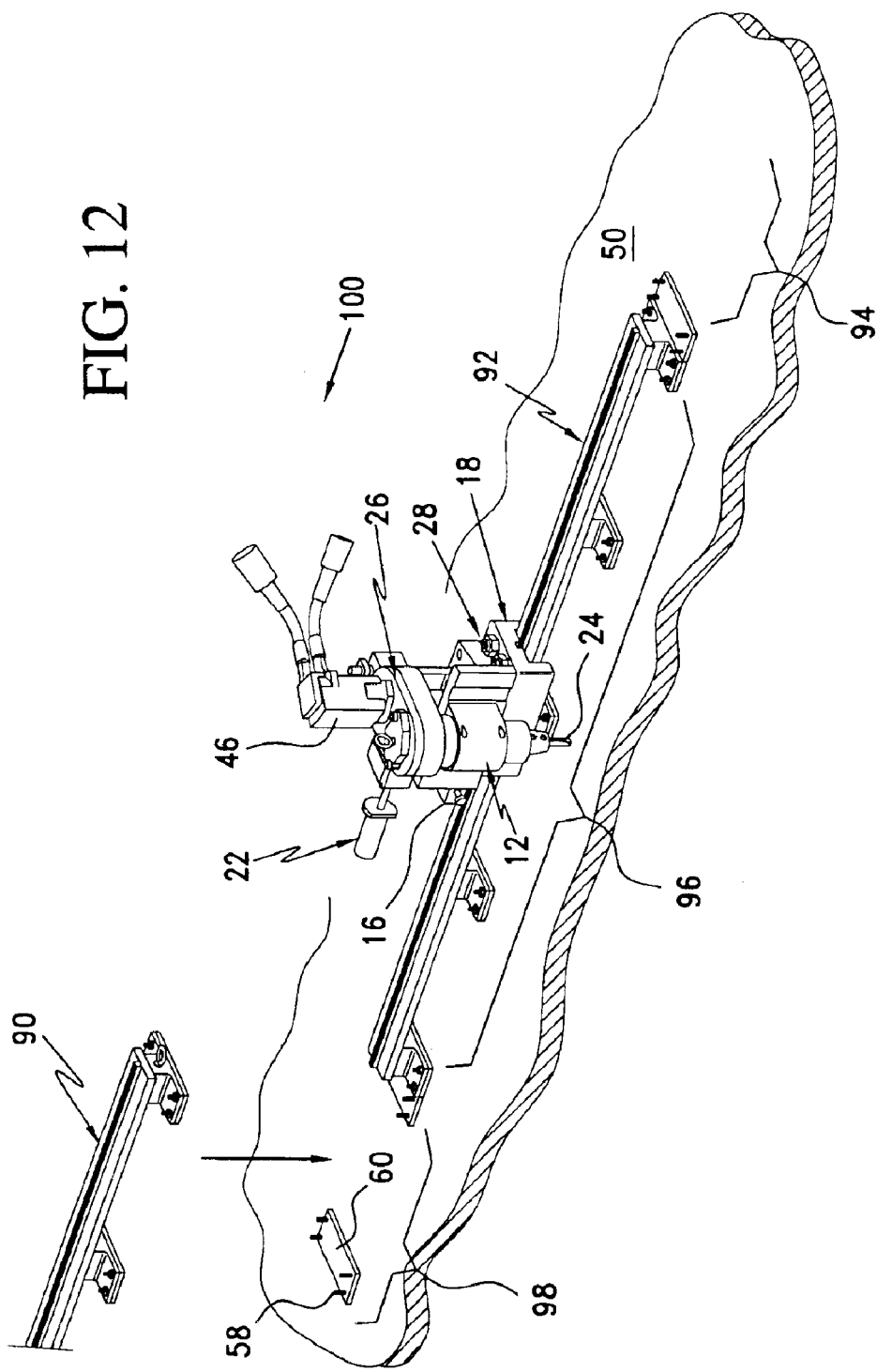
Figure 13:
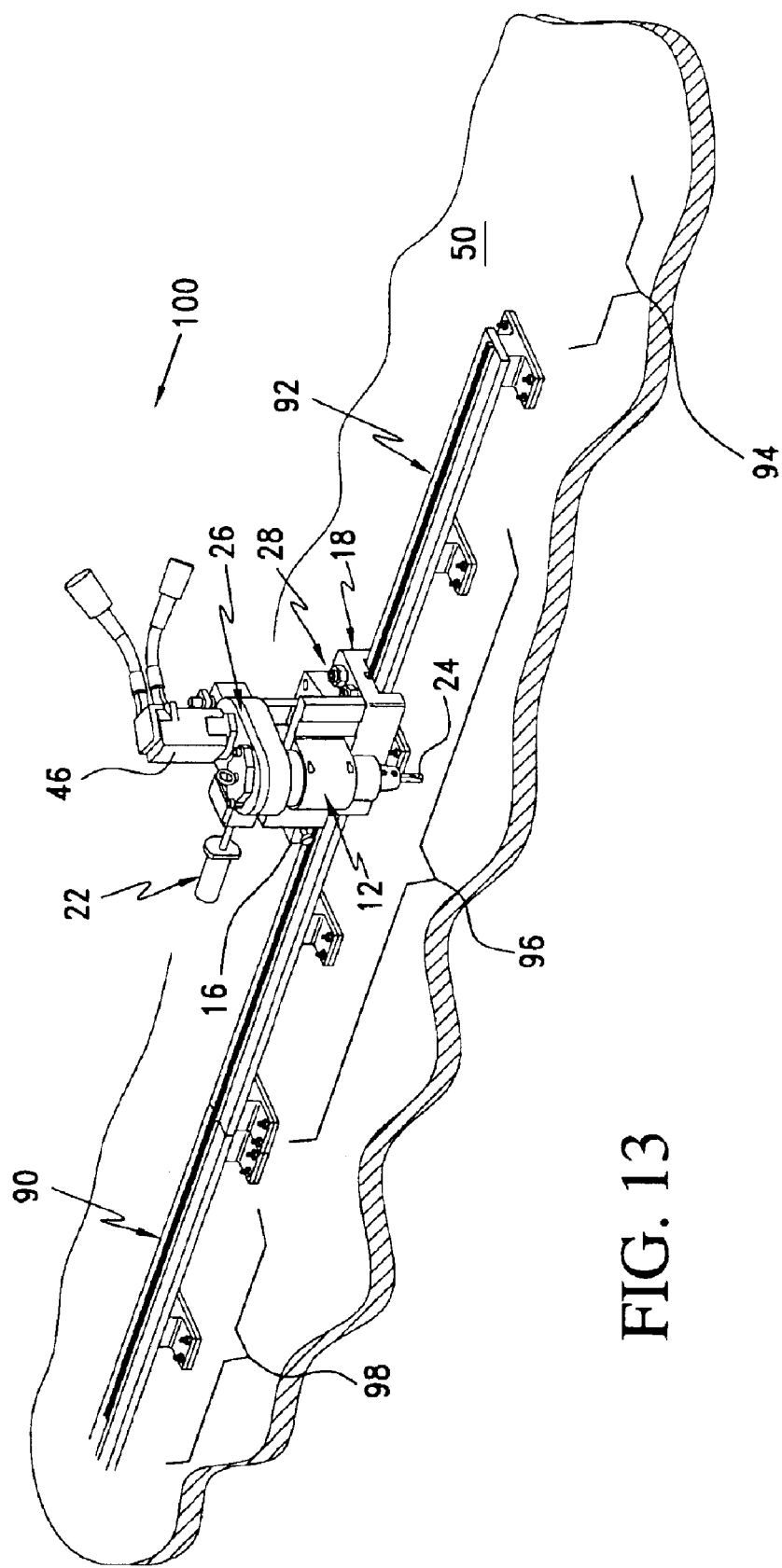

Referring to FIGS. 10–13, the invention may include a plurality of track elements 90, 92 that can be continuously reassembled in an end-to-end relationship along the workpiece 50. FIG. 10 shows first and second track elements 90, 92 positioned on first and second track areas 94, 96 and assembled in an end-to-end relationship such that end portions of the first and second track elements 90, 92 are laterally adjacent and define transport path 100. FIG. 11 shows the removal of the first track element 94 from the first track area 94. Securing elements 32 are appropriately supported onto the workpiece 50 in the third track area 98 and the securing elements 32 are removed from the first track area 94. FIG. 12 shows the first track element 90 being positioned over the third track area 98. FIG. 13 shows the first track element 90 supported on the securing elements 32 positioned in the third track area 98 thereby extending the length of the transport path 100 relative to the second track element 92. The above-described process may be carried out over the length or diameter of the periphery of the workpiece.

Figure 14:
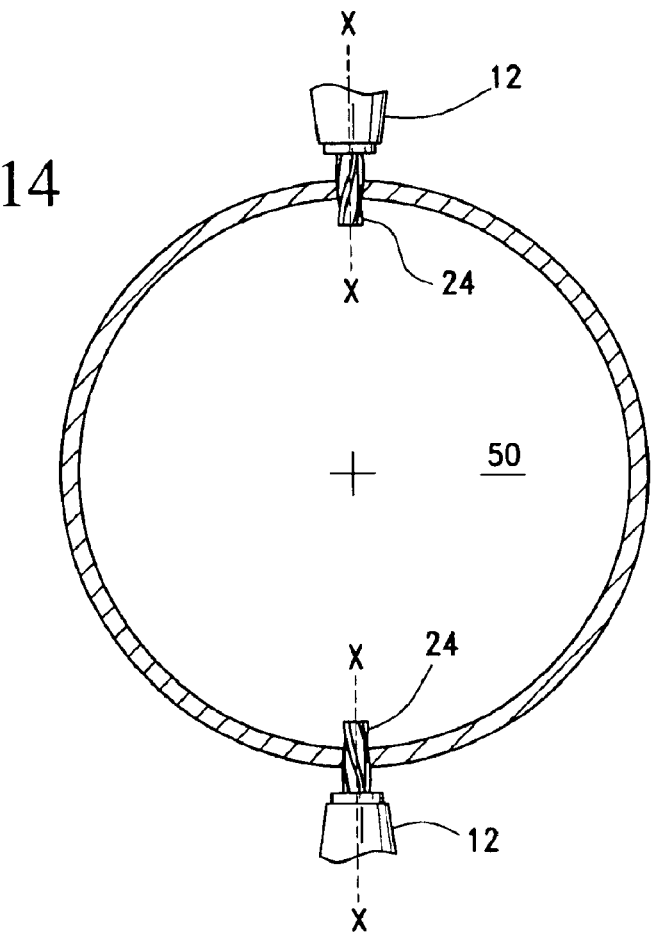
FIGS. 14–15 are schematic views illustrating the steps of performing a cutting operation according to a preferred method of the invention.
Figure 15:
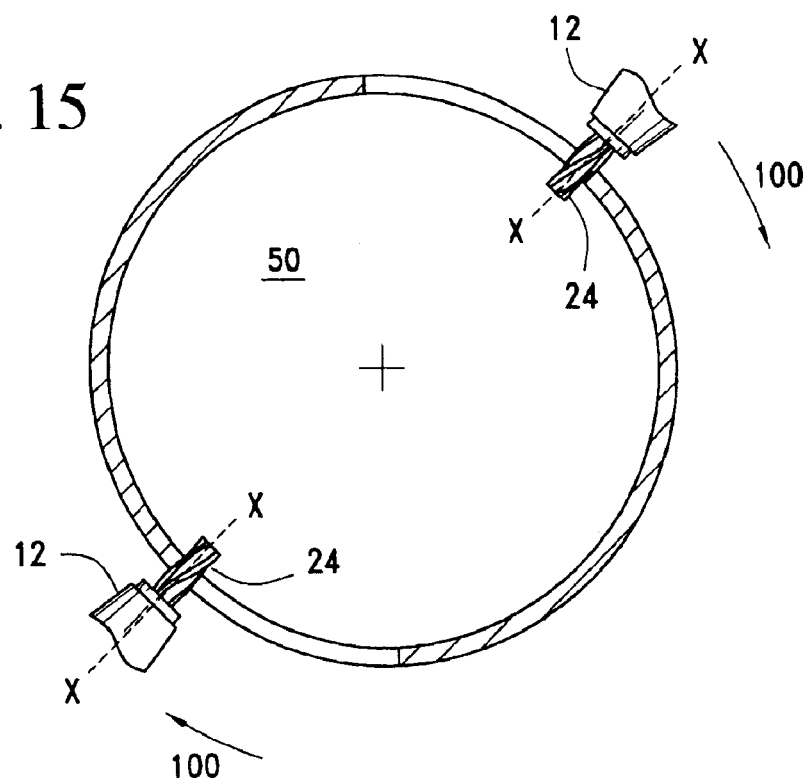

According to a preferred method of the invention, at least one cutting tool assembly 12 is provided and mounted for travel along a predetermined transport path about at least a portion of a workpiece. As shown in FIGS. 14 and 15, two cutting tool assemblies 12 may be rotatably mounted for travel along transport path 100 orbiting about a central axis of a hollow workpiece 50, such as a pipe or tube.

Each cutting tool assembly 12 includes a rotatably supported end mill 24 driven for rotation about a tool longitudinal axis X—X and mounted for travel along the predetermined transport path 100 transversely of its rotational axis about a central axis of the workpiece in a cutting plane. Upon rotary activation, the end mill 24 of each of the cutting tool assemblies is fed radially through the wall thickness of the workpiece 50 along its rotational axis and the cutting tool assembly 24 is moved along the transport path 100 as a side portion of the end mill cuts through the wall of the workpiece in a single pass along the transport path 100.

According to the method, the cutting tool assembly 12 may be mounted for travel on a portable lathe having a rotatable head and a fixed tool body configured to be secured onto a hollow workpiece, such as one described in U.S. Pat. No. 4,665,782 incorporated herein. Alternatively, the cutting tool assembly 12 may be mounted for travel on any other suitable device arranged to clamp onto a workpiece and provide a system for transport of the cutting assembly 12 thereabout.

Although multiple preferred embodiments of the invention have been described above, it is to be understood that various modifications could be made to the embodiments by any person skilled in the art without departing from the scope of the invention as defined in the claims that follow, and that the various embodiments could be used interchangeably with other embodiments.

We claim:

1. A cutting tool and track system, comprising:
   at least one track element configured to be attached to a surface of a workpiece, the at least one track element including a track member and a rack member supported along the longitudinal length of the track member and defining a transport path;
   a carriage assembly configured to ride along and to be guided and supported by the at least one track element;
   a carriage drive mechanism arranged to drivingly engage the carriage assembly and to drive the carriage assembly along the at least one track element;
   a cutting tool assembly carried by the carriage assembly, the cutting tool assembly including a cutting tool arranged to be rotated about a longitudinal axis and to be fed both along its axis of rotation and transversely of its axis of rotation for cutting a workpiece through a wall thickness of the workpiece; and
   a tool driving system connected to and arranged to transmit rotary input motion to the cutting tool;
   and wherein the carriage assembly includes at least one bearing assembly that is spring-biased into contact with the track member, the contact pressure of the at least one bearing assembly relative the track member being adjustable via an adjustment structure, said contact pressure being able to be fixed via a fixation device.

2. The cutting tool and track system according to claim 1, wherein the at least one track element comprises:
   at least two supports connected to a bottom surface of the track member and configured to be attached to a workpiece;
   wherein each of the supports is configured to be attached to a securing element supported on the workpiece.

3. The cutting tool and track system according to claim 2, wherein each of the securing elements includes a mount plate supported on the workpiece and a plurality of studs extending therefrom, the supports configured and arranged to receive and secure to the studs of the securing elements.

4. The cutting tool and track system according to claim 2, wherein the securing elements are studs supported on the workpiece, the supports configured and arranged to receive and secure to the studs.

5. The cutting tool and track system according to claim 1, wherein the carriage assembly comprises:
   a carriage deck configured to carry the cutting tool assembly and having at least two threaded holes extending therethrough; and
   at least two of the bearing assemblies received and retained by the threaded holes of the carriage deck, the adjustment structure of each bearing assembly including a pin element extending through a threaded sleeve member positioned in operative engagement with one of the threaded holes, and the bearing assemblies each including a plurality of conical compression-type springs, a first end of each of the pin elements engaging a bearing, the fixation device of each of the at least two bearing assemblies including a retaining nut engaging the respective sleeve member and positionable against the carriage.

6. The cutting tool and track system according to claim 5, wherein the carriage assembly further comprises a cam arrangement including:

a plurality of cam followers fixed to the carriage deck and arranged to ride along the track member; and at least two adjustable cam followers adjustably secured to the carriage deck and configured to be positioned against the track member.

7. The cutting tool and track system according to claim 1, further comprising:

an angle plate having first and second plate portions oriented perpendicular to one another, said angle plate arranged to support the cutting tool assembly along the first plate portion and be supported to the carriage assembly on the second plate portion.

8. The cutting tool and track system according to claim 1, further comprising a feed assembly including:

an upper plate having an upper hole and arranged to connect to the cutting tool assembly, a ratchet assembly being positioned within the upper hole;

a lower plate having a lower hole and arranged to connect to the carriage assembly, a feed nut being positioned within the lower hole;

a feed screw extending through the upper hole and engaging the ratchet assembly, the feed screw engaging the feed nut of the lower hole; and a lever secured to the feed screw, the lever manipulable so as to rotate the feed screw to linearly displace the cutting tool assembly along its longitudinal axis.

9. The cutting tool and track system according to claim 1, wherein a plurality of the track elements are assembled on a workpiece in an end-to-end relationship defining a continuous transport path.

10. The cutting tool and track system according to claim 1, wherein the cutting tool is an end mill.

11. The cutting tool and track system according to claim 1, wherein the track member of one of the track elements consists a single, elongate solid body.

12. The cutting tool and track system according to claim 1, wherein the track member of the at least one track element has generally planar top and bottom surfaces.

13. The cutting tool and track system according to claim 1, wherein the track member comprises a solid and generally rectangular cross-section.

14. A cutting tool and track system, comprising:

at least one track element configured to be attached to a surface of a workpiece, the at least one track element including a track member and a rack member supported along the longitudinal length of the track member and defining a transport path;

a carriage assembly configured to ride along and to be guided and supported by the at least one track element;

a carriage drive mechanism arranged to drivingly engage the carriage assembly and to drive the carriage assembly along the at least one track element;

a cutting tool assembly carried by the carriage assembly, the cutting tool assembly including a cutting tool arranged to be rotated about a longitudinal axis and to be fed both along its axis of rotation and transversely of its axis of rotation for cutting a workpiece through a wall thickness of the workpiece; and a tool driving system connected to and arranged to transmit rotary input motion to the cutting tool;

wherein the carriage assembly comprises:

a carriage deck configured to carry the cutting tool assembly and having at least two threaded holes extending therethrough; and at least two adjustable bearing assemblies received and retained by the threaded holes of the carriage deck, each bearing assembly including a pin element extending through a threaded sleeve member positioned in operative engagement with one of the threaded holes, and a plurality of conical compression-type springs, a first end of each of the pin elements engaging a bearing, the at least two bearing assemblies each including a retaining nut engaging the respective sleeve member and positionable against the carriage.

15. A cutting tool and track system, comprising:

at least one track element configured to be attached to a surface of a workpiece, the at least one track element including a track member and a rack member supported along the longitudinal length of the track member and defining a transport path;

a carriage assembly configured to ride along and to be guided and supported by the at least one track element;

a carriage drive mechanism arranged to drivingly engage the carriage assembly and to drive the carriage assembly along the at least one track element;

a cutting tool assembly carried by the carriage assembly, the cutting tool assembly including a cutting tool arranged to be rotated about a longitudinal axis and to be fed both along its axis of rotation and transversely of its axis of rotation for cutting a workpiece through a wall thickness of the workpiece; and a tool driving system connected to and arranged to transmit rotary input motion to the cutting tool;

a feed assembly including an upper plate having an upper hole and arranged to connect to the cutting tool assembly, a ratchet assembly being positioned within the upper hole;

a lower plate having a lower hole and arranged to connect to the carriage assembly, a feed nut being positioned within the lower hole;

a feed screw extending through the upper hole and engaging the ratchet assembly, the feed screw engaging the feed nut of the lower hole; and a lever secured to the feed screw, the lever manipulable so as to rotate the feed screw to linearly displace the cutting tool assembly alone its longitudinal axis.

* * * * *